United States Patent
Hundt et al.

(10) Patent No.: US 12,447,835 B2
(45) Date of Patent: Oct. 21, 2025

(54) VEHICLE CHARGING ARRANGEMENT

(71) Applicant: Patrick Industries, Inc., Elkhart, IN (US)

(72) Inventors: Christopher Hundt, Bremen, IN (US); Derek Preston Thompson, South Bend, IN (US)

(73) Assignee: Patrick Industries, Inc., Elkhart, IN (US)

( * ) Notice: Subject to any disclaimer, the term of this patent is extended or adjusted under 35 U.S.C. 154(b) by 73 days.

(21) Appl. No.: 18/503,629

(22) Filed: Nov. 7, 2023

(65) Prior Publication Data

US 2024/0157814 A1   May 16, 2024

Related U.S. Application Data (60) Provisional application No. 63/383,145, filed on Nov. 10, 2022.

(51) Int. Cl.
| | |
|---|---|
| *B60L 50/61* | (2019.01) |
| *B60L 50/15* | (2019.01) |
| *B60L 53/51* | (2019.01) |
| *B60R 16/033* | (2006.01) |

(52) U.S. Cl.
CPC .............. *B60L 50/61* (2019.02); *B60L 50/15* (2019.02); *B60L 53/51* (2019.02); *B60R 16/033* (2013.01)

(58) Field of Classification Search
None
See application file for complete search history.

(56) References Cited

U.S. PATENT DOCUMENTS

| | | |
|---|---|---|
| 6,148,258 A  | 11/2000 | Boisvert et al. |
| 6,239,996 B1 | 5/2001  | Perreault et al. |
| 6,992,348 B2 | 1/2006  | Kleint et al. |
| 7,535,116 B2 | 5/2009  | Daigle et al. |
| 8,427,083 B2 | 4/2013  | Warmenhoven |
| 8,525,492 B2 | 9/2013  | Peterson et al. |
| 8,627,914 B2 | 1/2014  | Berbari |
| 9,126,544 B2 | 9/2015  | Larson et al. |
| 9,610,824 B2 | 4/2017  | Allen et al. |
| 10,333,337 B2 | 6/2019 | Cavanaugh et al. |
| 10,906,408 B2 | 2/2021 | Song |
| 11,018,520 B2 | 5/2021 | Cavanaugh et al. |

(Continued)

OTHER PUBLICATIONS

Online forum thread titled "Dual alternators, why or why not . . . ", webpage <https://www.classbforum.com/forums/f5/dual-alternators-why-or-why-not-3082.html>, 15 pages, retrieved from Internet on Mar. 8, 2024.

(Continued)

*Primary Examiner* — Rexford N Barnie
*Assistant Examiner* — Aqeel H Bukhari
(74) *Attorney, Agent, or Firm* — Price Heneveld LLP (57) ABSTRACT

A power system for a vehicle includes a first alternator and a second alternator each driven by an engine system of the vehicle. A first power storage device is electrically coupled with and chargeable by the first and second alternators. The first power storage device is configured to store power at a first storage voltage. A second power storage device is electrically coupled with and chargeable by the second alternator. The second power storage device is configured to store power at a second storage voltage different than the first storage voltage.

20 Claims, 5 Drawing Sheets

(56) References Cited

U.S. PATENT DOCUMENTS

| | | |
|---|---|---|
| 11,190,026 B2 | 11/2021 | Le et al. |
| 11,855,478 B2 | 12/2023 | Cavanaugh et al. |
| 2002/0070556 A1 | 6/2002 | Patel et al. |
| 2005/0002140 A1 | 1/2005 | Borrego Bel et al. |
| 2011/0080040 A1 | 4/2011 | Kumar |
| 2012/0074777 A1 | 3/2012 | Sugiyama et al. |
| 2013/0119665 A1 | 5/2013 | Berbari |
| 2013/0220588 A1 | 8/2013 | Allen et al. |
| 2013/0249468 A1 | 9/2013 | Bajjuri et al. |
| 2013/0249469 A1 | 9/2013 | Pahlevaninezhad et al. |
| 2014/0361611 A1 | 12/2014 | Saint-Leger et al. |
| 2015/0274025 A1 | 10/2015 | Demure et al. |
| 2016/0089992 A1 | 3/2016 | Le et al. |
| 2016/0138550 A1 | 5/2016 | Kirlew et al. |
| 2016/0152146 A1 | 6/2016 | Adra et al. |
| 2016/0176534 A1 | 6/2016 | Himmelmann et al. |
| 2016/0311331 A1* | 10/2016 | Guthrie ................... B60L 8/006 |
| 2017/0190262 A1* | 7/2017 | Jin ....................... H01M 10/482 |
| 2017/0305283 A1 | 10/2017 | Huh et al. |
| 2018/0354437 A1 | 12/2018 | Dixon et al. |
| 2021/0281100 A1 | 9/2021 | Cavanaugh et al. |
| 2022/0258647 A1* | 8/2022 | Joao ........................ B60L 53/24 |

OTHER PUBLICATIONS

Roadtrek, Inc., Owner's Manual E-trek, 2014 copyright notice.
Roadtrek, Inc., Owner's Manual E-Option Supplement, 2014 copyright notice.

\* cited by examiner

VEHICLE CHARGING ARRANGEMENT

CROSS-REFERENCE TO RELATED APPLICATIONS

This application claims the benefit of U.S. Provisional Patent Application No. 63/383,145, filed on Nov. 10, 2022, entitled "VEHICLE CHARGING ARRANGEMENT," the entire disclosure of which is incorporated herein by reference.

BACKGROUND OF THE DISCLOSURE

The present disclosure generally relates to a vehicle charging arrangement and, more particularly, to a power system for a recreational vehicle.

SUMMARY OF THE DISCLOSURE

One example as shown and described herein includes a power system for a vehicle. The power system includes a first alternator and a second alternator each driven by an engine system of the vehicle. A first power storage device is electrically coupled with and chargeable by the first and second alternators. The first power storage device is configured to store power at a first storage voltage. A second power storage device is electrically coupled with and chargeable by the second alternator. The second power storage device is configured to store power at a second storage voltage different than the first storage voltage.

Another example as shown and described herein may further or alternatively include a dual charging system for a recreational vehicle. The dual charging system includes a first alternator driven by an engine system of the vehicle and configured to output a first charging voltage. A second alternator is driven by the engine system and configured to output a second charging voltage different than the first charging voltage. A first power storage device is electrically coupled with and chargeable by the first and second alternators. The first power storage device is configured to power a primary circuit for the vehicle comprising a powertrain device for the engine system. The first power storage device is configured to store power at a first storage voltage. A second power storage device is electrically coupled with and chargeable by the second alternator. The second power storage device is configured to power an auxiliary circuit for the vehicle. The second power storage device is configured to store power at a second storage voltage different than the first storage voltage. A charger unit interposes the second alternator and the first power storage device to reduce the second charging voltage to the first charging voltage for charging the first power storage device. The charger unit is further configured to limit a backflow electrical current from flowing from the first power storage device toward the second alternator.

Yet another example as shown and described herein may further or alternatively include a charging arrangement for a recreational vehicle. The charging arrangement includes a primary electrical system powered by a first alternator driven by an engine system of the vehicle and configured to output a first charging voltage for the primary electrical system. The primary electrical system is configured to power a powertrain of the recreational vehicle and charge a first battery. A secondary electrical system is powered by a second alternator driven by the engine system and configured to output a second charging voltage for the secondary electrical system. The secondary electrical system config- ured to power auxiliary components of the recreational vehicle and charge a second battery. A charger unit electrically interposing the primary and secondary electrical systems is configured to step down the second charging voltage to the first charging voltage or step up the first charging voltage to the second charging voltage. The stepping down allows the secondary electrical system to charge the first battery and the stepping up allows the primary electrical system to charge the second battery.

Still yet another example as shown and described herein may further or alternatively include a charging arrangement for a recreational vehicle. The charging arrangement includes a primary electrical system powered by a first alternator driven by an engine system of the vehicle and configured to output a first charging voltage for the primary electrical system. The primary electrical system is configured to power a powertrain of the recreational vehicle and charge a first battery. A secondary electrical system is powered by a second alternator driven by the engine system and configured to output a second charging voltage for the secondary electrical system. The secondary electrical system is configured to power auxiliary components of the recreational vehicle and charge a second battery. A charger unit electrically interposes the primary and secondary electrical systems and is configured to step down the second charging voltage to the first charging voltage to allow the secondary electrical system to charge the first battery. The charger unit includes asymmetric conductance circuitry that limits current flow from the primary electrical system to the secondary electrical system and allow current flow to the primary circuit from the secondary electrical system.

Another example as shown and described herein may alternatively or further include a charging arrangement for a recreational vehicle. The charging arrangement includes a primary electrical system powered by a first alternator and a second alternator each driven by an engine system of the vehicle and configured to output a first charging voltage for the primary electrical system. The primary electrical system is configured to power a powertrain of the recreational vehicle and charge a first battery. A secondary electrical system is configured to output a second charging voltage for the secondary electrical system different than the first charging voltage. The secondary electrical system configured to power auxiliary components of the recreational vehicle and charge a second battery. A charger unit electrically interposes the primary and secondary electrical systems and is configured to step down the second charging voltage to the first charging voltage or step up the first charging voltage to the second charging voltage. The stepping down allows the secondary electrical system to charge the first battery and the stepping up allows the primary electrical system to charge the second battery.

Yet another example as shown and described herein may further or alternatively include a charging system for a recreational vehicle. The charging system includes a primary electrical system powered by a first alternator and a second alternator each driven by an engine system of the vehicle. The primary electrical system is configured to power a powertrain of the recreational vehicle and charge a first battery at a first charging voltage. A secondary electrical system has a second battery charged by the second alternator. A converter-charger device electrically interposes the second alternator and the first battery. The converter-charger is configured to step down an operating voltage of a portion of the auxiliary circuit to the first charging voltage. A relay electrically interposes the converter-charger and the primary circuit for selectively supplying the first charging voltage to the primary circuit.

These and other features, advantages, and objects of the present disclosure will be further understood and appreciated by those skilled in the art by reference to the following specification, claims, and appended drawings.

DETAILED DESCRIPTION OF THE PREFERRED EMBODIMENTS

Figure 1:
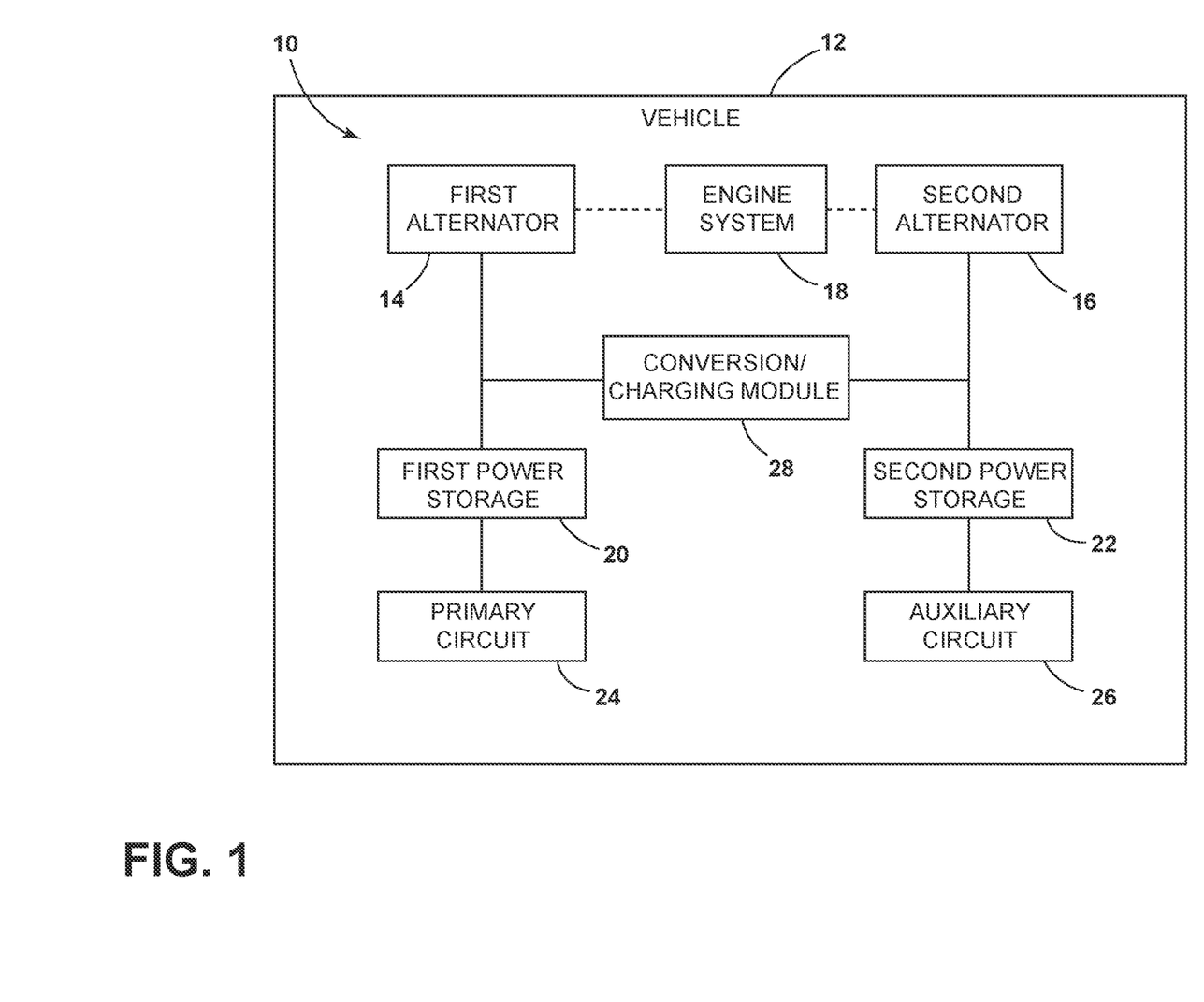
FIG. 1 is a block diagram of a power system incorporated into a vehicle of the present disclosure.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In general, a vehicle charging arrangement of the present disclosure generally provides for an electrical power distribution system that is configured to charge a first power source of a primary electrical circuit and a second power source of a second electrical circuit from a pair of alternators that are connected with an engine of the vehicle. In general, the alternators convert mechanical energy from the engine system to alternating current (AC) electricity that is rectified to form direct current (DC) electricity as an output of each alternator. The alternators of the present disclosure may have the same or different DC voltage outputs depending on the particular implementation, but in general are configured to power a primary battery system of the vehicle charging system (e.g., a 12V lead acid battery) and/or a secondary battery system. Accordingly, the primary power source (e.g., the primary battery system) may or may not be isolated from either of the alternators according to some aspects of the present disclosure. In some examples, one of the pair of alternators is assigned to a first electrical circuit and another of the pair of alternators is assigned to a second electrical circuit, and excess electrical power from the second circuit may be employed to power the first electrical circuit. In some examples, either or both of the first and second electrical circuits may be used to power the other of the first and second electrical circuits, via two-way communication.

It is contemplated that these power-sharing modes of the vehicle charging arrangement may have one or more conversion modules in order to step down a voltage of the second circuit to a voltage of the first circuit, or vice versa.

Referring now to FIG. 1, reference numeral 10 generally designates a power system for a vehicle 12. The power system 10 includes a first alternator 14 and a second alternator 16, each driven by an engine system 18 of the vehicle 12. Specifically, and in one example, the first alternator 14 and the second alternator 16 may be driven by a single or multiple, separate belts or chain drives mechanically coupling the alternators 14, 16 to the engine system 18. A first power storage device 20 is electrically coupled with and chargeable by the first and second alternators 14, 16. The first power storage device 20 is configured to store power at a first storage voltage. A second power storage device 22 is electrically coupled with and chargeable by the second alternator 16. The second power storage device 22 may be configured to store power at a second storage voltage different than the first storage voltage. For example, the first storage voltage may be about 12V, while the second storage voltage may be about 12V, 24V or 48V. The vehicle 12 may be a land vehicle, such as a truck, a bus or a recreational vehicle (RV), e.g., a motor home, a camper van, towable trailer, and the like, or a marine vehicle or vessel, such as a boat, recreational personal watercraft, and the like. In some particular examples, the vehicle 12 is a recreational land vehicle that requires complex interior and exterior electrical devices that may require high power consumption. The power system 10 of the present disclosure may generally be implemented to facilitate distribution of the power amongst various subsystems of the electrical system of the vehicle 12 in order to improve efficiency and provide redundancy in the form of backup power and/or more than one source of power generation.

Referring generally to FIGS. 1-4, the first power storage device 20 may be configured to power a primary circuit 24 of the vehicle 12, and the second power storage device 22 may be configured to power an auxiliary circuit 26 of the vehicle 12. The primary circuit 24 may be referred to as a first circuit 24, and the auxiliary circuit 26 may be referred to as a second circuit or secondary circuit 26 in some examples shown and described herein. The primary circuit 24 may be linked with or otherwise in electrical communication with the auxiliary circuit 26 to allow the auxiliary circuit 26 to provide electrical power to the primary circuit 24 and, in some examples, vice versa. In further examples that will be described herein, one-way communication may be provided from the auxiliary circuit 26 toward the primary circuit 24 and electrical current may be limited or impeded from flowing from the primary circuit 24 toward the auxiliary circuit 26.

Referring now to FIGS. 1-4, the power system 10 may include a power charging module 28, or a charger unit 28, that interposes two portions of the circuitry in order to step down or step up a voltage and allow for unidirectional or, alternatively, bidirectional charging. In general, the charger unit 28 interposes the auxiliary circuit 26 and the primary circuit 24 and serves to convert a higher voltage associated with the auxiliary circuit 26 to a lower voltage associated with the primary circuit 24 and/or to convert a lower voltage associated with the primary circuit 24 to a higher voltage associated with the auxiliary circuit 26 (e.g., in two-way charging examples). Further, the charger unit 28 is configured to supply constant or pulsed DC power to one or more batteries. As will further be described in reference to FIG. 4, the power charger unit 28 may interpose the first and second alternators 14, 16 and the auxiliary circuit 26.

Figure 2:
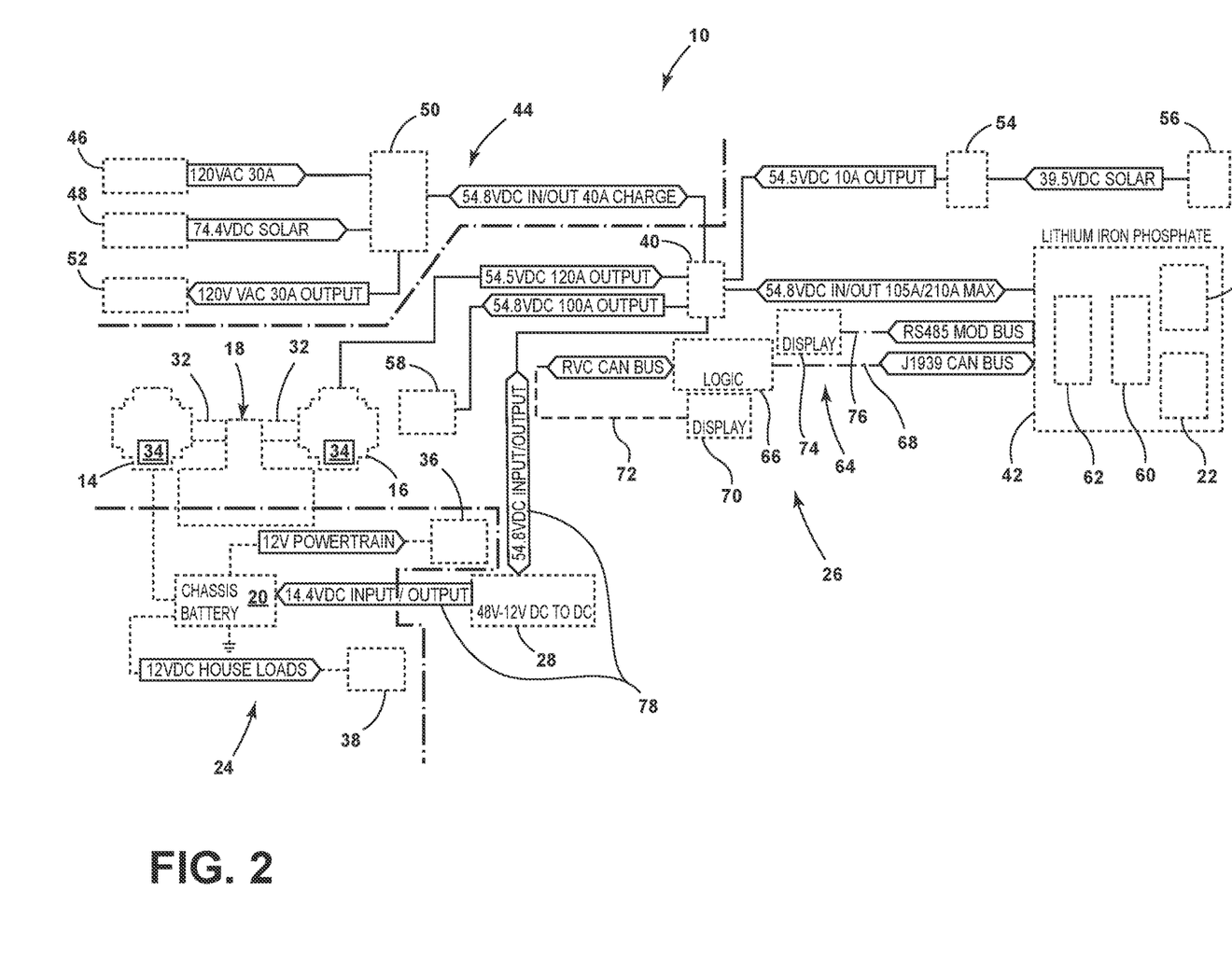
FIG. 2 is a block diagram of one exemplary implementation of the power system of the present disclosure.
Figure 3:
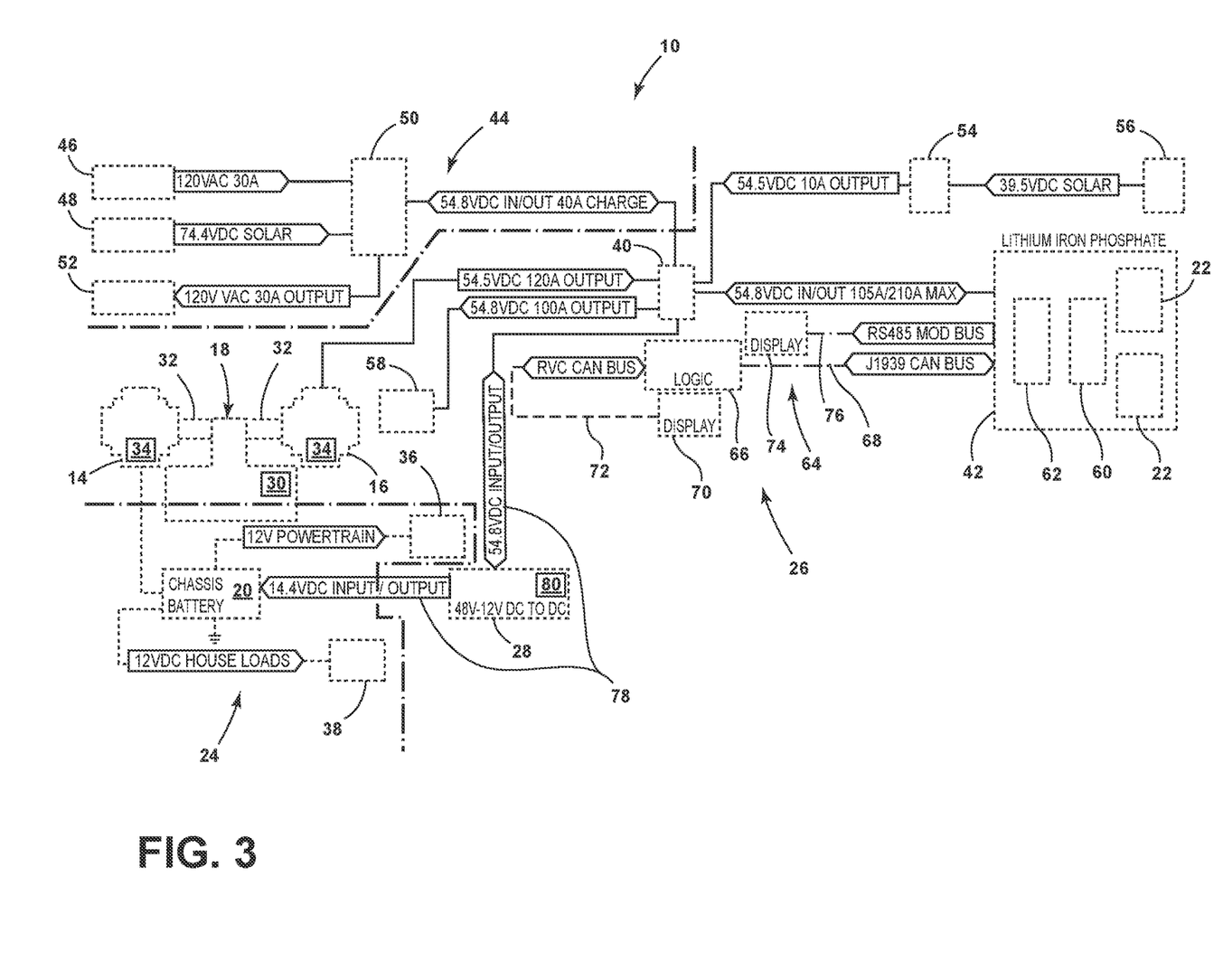
FIG. 3 is a block diagram of one exemplary implementation of the power system of the present disclosure.
Figure 4:
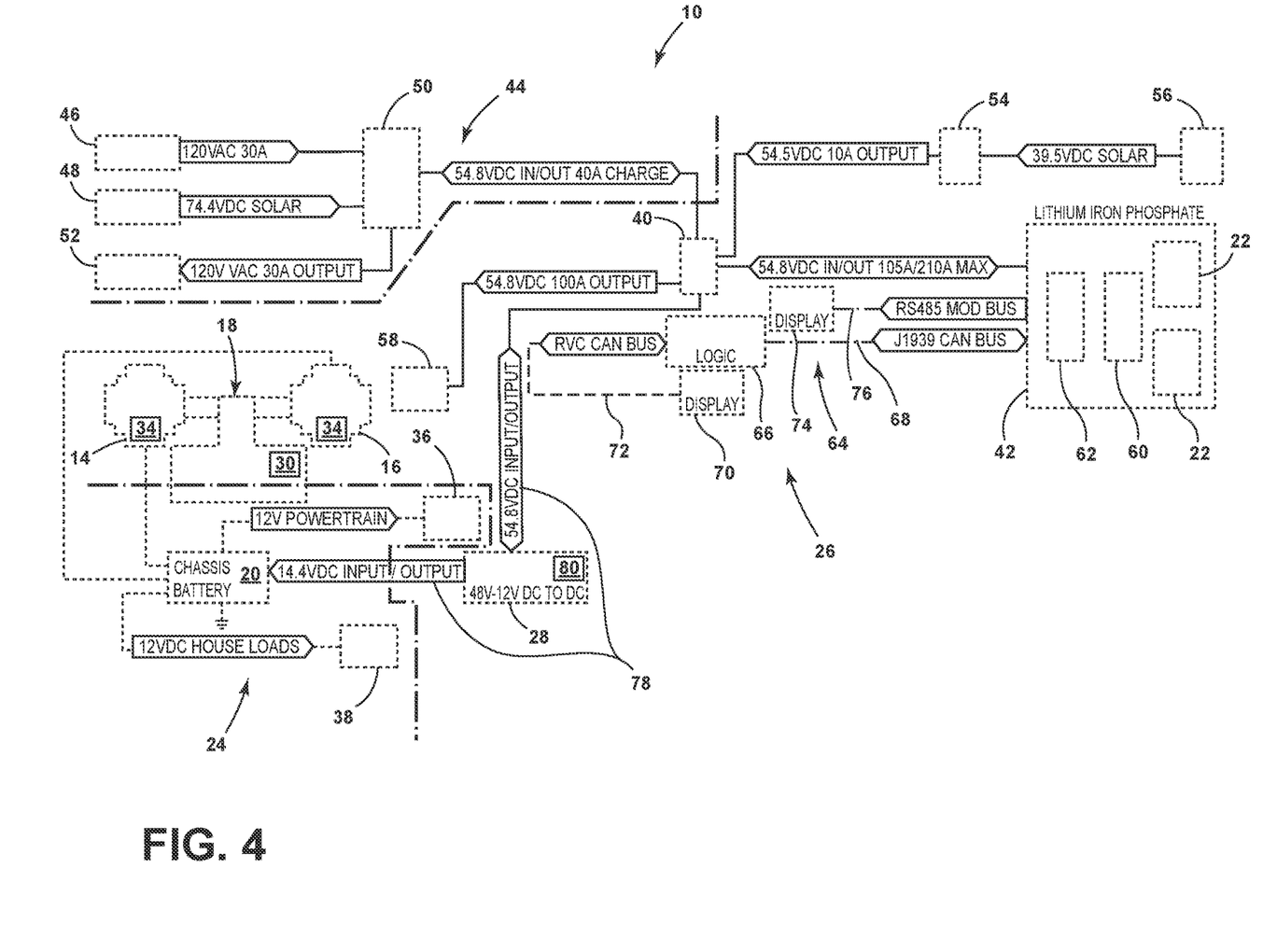
FIG. 4 is a block diagram of one exemplary implementation of the power system of the present disclosure.

As illustrated in FIGS. 2-4, the charger unit 28 interposes the second alternator 16 and the primary circuit 24 in one example. In general, the location of the power charger unit 28 (or several power chargers) may depend on a location within the overall circuit at which the voltage levels should be stepped down or stepped up in order to provide sufficient charge to the first and/or second power storage devices 20, 22. For example, the charger unit 28 may electrically interpose the second alternator 16 and the first power storage device 20 due, at least in part, to different operating voltages amongst the first alternator 14 and the second alternator 16. However, as illustrated in FIG. 4, the charger 28 may interpose the auxiliary circuit 26 and both of the first and second alternators 14, 16 when first and second alternators 14, 16 have a common output voltage that is different from the voltage of the auxiliary circuit 26. In some examples, the charger 28 is a Buck-Boost charger that may incorporate diodes or solid-state devices (MOSFET transistors) that allow for DC-to-DC charging selectively.

Referring now to FIGS. 2-4, the engine system 18 may include an engine 30 and a pair of belts 32 that are connected with the engine 30 for driving a shaft or other coupling that receives mechanical energy from the engine 30. The mechanical energy transfer to the first and second alternators 14, 16 is converted to electrical energy in the form of AC voltage via electromagnetic properties of the first and second alternators 14, 16 (e.g., rotating magnetic fields with a stationary armature). The AC voltage produced by the first and second alternators 14, 16 is then rectified via at least one rectifier 34 in each of the first and second alternators 14, 16 to convert the AC electricity to DC power. For example, the rectifiers 34 may include one or more diodes arranged in an array that allows for conversion of the AC signals to DC signals. Other electrical components, such as capacitors, may be employed for smoothing the output of the first alternator 14/rectifier 34, though it is contemplated that the first and/or second power storage devices 20, 22 may serve the smoothing functions for half-wave or full-wave rectified signals output from the first and/or second alternators 14, 16. It is also contemplated that the second alternator 16, when operable as a 48V alternator, may omit some or all of the rectification circuitry 34 due to different electrical properties from the first alternator 14. For example, the first alternator 14 may include a plurality of avalanche diodes configured to limit electrical transients upon sudden load shifts, and the second alternator 16 may omit such avalanche diodes.

In general, the voltages produced by the first and second alternators 14, 16 may be referred to as first and second charging voltages corresponding to the first and second alternators 14, 16, respectively. Further, the charging voltages may be smoothed DC signals that are operable to charge the first and second power storage devices 20, 22 by the first and second alternators 14, 16 in the manner previously described. It is contemplated that the rectifiers 34 may be disposed in or with the alternators 14, 16, such that the rectifiers 34 are part of the alternators 14, 16 or alternator assemblies.

Still referring to FIGS. 2-5, and in the present examples, the primary circuit 24 includes the first power storage device 20 in the form of a lead acid battery. In some examples, multiple lead acid batteries are provided for powering the primary circuit 24. In general, the primary circuit 24 is configured to power a powertrain 36 of the vehicle 12, including various electrical components and/or electromechanical components such as the engine 30, a transmission, a driveshaft, axles, differentials, and like components that are employed for driving the vehicle 12. Although illustrated as a 12 VDC power signal for the powertrain 36, it is contemplated that other voltages may be employed to power the powertrain 36. Also, coupled with the first power storage device 20 may include a low-voltage distribution panel 38 for house loads of the vehicle 12, such as low voltage lighting, heating devices, air conditioning units, outlet ports in a cabin of the vehicle 12, and the like. In some examples, the low-voltage distribution panel 38 may be incorporated in another portion of the power system 10, such as the auxiliary circuit 26. Thus, the low-voltage distribution panel 38 may be considered separately from the primary circuit 24 in some examples.

The charging voltage of the first power storage device 20 may, in some examples, be slightly higher than an output voltage of the first power storage device 20. For example, if the first power storage device 20 is configured to output 12V for the powertrain 36 and the house loads, the first charging voltage may be approximately 10% to 30% higher than 12V (e.g., 14V, etc.). In some examples, the output voltage of the first power storage device 20 may be in the range of 1 to 35 percent of the nominal voltage. By incorporating a higher charging voltage (e.g., the first charging voltage), the first power storage device 20 may store power at a first storage voltage of 12V. It is contemplated that the voltages shown and described are merely exemplary and that, in general, the present disclosure anticipates various DC voltages for powering the lead acid battery, for example, of the first power storage device 20. For example, the first charging voltage may be in the range of 12.5V to 15V.

Referring now to the auxiliary circuit 26 depicted in FIGS. 2-4, various subsystems may be coupled with a high voltage distribution panel 40 of the auxiliary circuit 26. The auxiliary circuit 26, and thus the various components directly electrically coupled with the high voltage distribution panel 40, may be operable at a voltage level higher than a voltage level of the primary circuit 24. For example, the auxiliary circuit 26 may be operable between voltages in the range of 24 VDC to 100 VDC in some examples. For example, the operating voltage of the auxiliary circuit 26 may be 48V or higher (e.g., approximately 54V). Similar to the first charging voltage, if a second storage voltage corresponding to the second power storage device 22 is 48V, then the operating voltage of the auxiliary circuit 26 may be a second charging voltage for the second power storage device 22, with each second charging voltage being between 10% and 30% higher than the second storage voltage. In some examples, the output voltage of the second power storage device 22 may be in the range of 1 to 35 percent of the nominal voltage. As will be described further herein, the second power storage device(s) 22 may be charged by a separate management unit, or circuit, 42 that converts the charging voltage to an appropriate level for charging the second power storage devices 22.

Still referring to FIGS. 2-4, the auxiliary circuit 26 may include a shore power circuit 44 operably coupled with the high voltage distribution panel 40. The shore power circuit 44 may have bidirectional communication to allow for input and output to/from the second power storage device 22, and thus may be operable to charge the second power storage device 22 via a power connection 46 and/or receive power from the second power storage device 22. In some examples, the bidirectional communication may occur asynchronously, such that power may be output to the second power storage device 22 at a different time than power being received from the second power storage device 22. The term "shore power"

may refer to any external power connection that is typically associated with campsites, docking sites, mooring sites, parking spaces, or any other locale associated with parked vehicles that receive power from the existing infrastructure associated with an area of the parked vehicle. For example, the shore power may be received from an existing connection location that supplies electrical power at a conventional AC voltage (e.g., 115 VAC or 120 VAC) and at a power level in the range of 15 amperes to 60 amperes (e.g., 30A). Further, the shore power circuit 44 may include power generated via a solar panel 48 associated with or disposed adjacent to the site to allow the site to be self-powered or supplemented via self-powering by the solar panel 48. In some examples, the solar panel 48 is disposed on or within the vehicle 12.

In general, the voltage output of the solar panel 48 may be a DC voltage that exceeds or is approximately the voltage of the auxiliary circuit 26. Each of the 120V connection 46 and the solar panel 48 are electrically coupled to a solar inverter charger 50 that may be employed to charge the second power storage device 22 via the shore power circuit 44. In addition to operating as a charger, the solar inverter charger 50 may also invert the voltage associated with the battery (e.g., 51.4 VDC) to 120 VAC power to feed to an AC distribution panel 52. The AC distribution panel 52 may be operable at a conventional household voltage of 115 VAC to 120 VAC to power outlets or other devices associated with interior and exterior appliances of the vehicle 12. In this way, the shore power circuit 44 may provide logical power for various features of the vehicle 12 and/or may be operable to have power stored in the power system 10 by converting, via e.g., a rectification circuit, AC voltage to a target DC voltage for charging the second power storage device 22. In some examples, the shore power circuit 44 is completed when a plug or other connector is coupled outside of a coach of the vehicle 12 with shore power.

The auxiliary circuit 26 may also include a solar boost charger 54 device in electrical communication with the high voltage distribution panel 40 for supplying power to the auxiliary circuit 26. The solar boost charger 54 may include rectification circuitry and/or voltage dividing circuitry that is configured to modify or step up a low and/or varying voltage provided via a solar device, such as a solar blanket, connected via a solar port 56. For example, power from the sun via sun irradiation may be converted into electrical energy by the solar blanket using a photovoltaic (PV) effect and received by the auxiliary circuit 26 via the solar port 56. Such PV effect may also or alternatively be employed via the solar panel 48 of the shore power circuit 44. Power supply from the solar port 56 may then be boosted via, for example, the boost converter 54 to convert a lower voltage (e.g., 40 VDC) to a higher voltage (e.g., 54.5 VDC) in order to supply one or more of the power storage devices with electrical power. It is contemplated that the solar boost charger 54 may output a lower current and an input having higher voltage based on a higher current in a lower voltage.

Although shown and described as including the shore power circuit 44 and the solar boost charger 54 and associated components, the auxiliary circuit 26 may include various other components not specifically illustrated that relate to aspects of the vehicle 12 that require power. For example, interior lighting, ovens, microwaves, an air conditioning unit 58, and the like, may be powered via the auxiliary circuit 26. As such, other converters may be employed to step up the voltage of the auxiliary circuit 26 to voltages associated with conventional appliances for recreational vehicles. In the configuration illustrated, the air conditioner (AC) 58 may be configured to run on a relatively high DC voltage and thus be coupled with the high voltage distribution panel 40. In the example illustrated, the AC unit is operable at a voltage of 48 VDC and may be configured to cool the cabin of the vehicle 12.

With continued reference to FIGS. 2-4, the second power storage device 22 previously described may be incorporated into the management circuit 42. The management circuit 42 may communicate with the high voltage distribution panel 40 by being powered from and/or supplying power to the high-voltage distribution panel 40. The management circuit 42 may include one or more of the second power storage device 22 that are managed or self-regulated via a battery management system (BMS) logic device 60. The BMS logic device 60 may include a processor and a memory. The memory may store instructions and/or logic that, when executed by the processor, causes the BMS logic device 60 to monitor and control charging and/or cell balancing (e.g., power distribution) of the one or more second power storage devices 22. For example, the second power storage device 22 may be batteries having lithium iron phosphate cells. Power to the individual cells may be monitored and, based on feedback to the BMS logic device 60 (e.g., a capacity level, a fill level, a current, a current flux, a voltage, a differential, and the like), the BMS logic device 60 may disconnect or connect charging power to the batteries.

The management circuit 42 may also include a battery distribution unit (BDU) 62 that includes various protection circuitry and power management circuitry for shutting off or allowing power to the second power storage device 22. For example, the battery distribution unit 62 may be built in with the second power storage device 22 and controlled via the BMS logic device 60 via electrical contactors that complete or disconnect electrical current flow from/to the high voltage distribution panel 40 by energizing or de-energizing a solenoid in the contactor. The contactors may include a plurality of contacts at high or low voltage (e.g., 51.4V and/or 12V) to allow for the primary connection to be completed and allow current flow to/from the second power storage device 22 and/or to complete a feedback circuit associated with the BMS logic device 60. Additionally, or alternatively, the BDU 62 may also include pre-charging resistors, relays, and fusing and/or circuit breakers that are configured to open upon overvoltage or overcurrent conditions that may damage or inhibit functionality of the management circuit 42.

A communication circuit 64 may also be provided in the auxiliary circuit 26 for monitoring and/or controlling various features of the management circuit 42. The communication circuit 64 may include control circuitry 66, such as a controller 66 that is configured to communicate with the management circuit 42 to adjust the management circuit 42 to control electrical current or voltage applied to the second power storage device 22. The control circuit 66 may include a processor and memory that stores instructions that, when executed by the processor, causes the control circuitry 66 to communicate signals over a first bus 68 to the management circuit 42 to control at least a portion of the management circuit 42. In some examples, the first bus 68 is a controller area network (CAN) physical connection that allows microprocessors to communicate with one another without a host computer. In general, the control circuit 66 serves to regulate the voltage of regulation circuitry disposed in the management circuit 42 to control the voltage level or current level applied to the second power storage device 22 (e.g., the electrochemical cells) by communicating pulse-width modulation (PWM) signals to adjust a field current and/or voltage of the regulation circuitry. The control circuit 66 may also convert battery information received via the first bus 68 from the management circuit 42 to useful presentation for a user, such as a driver or a passenger, of the power system 10. The control circuitry 66 may further communicate the battery information (e.g., voltage levels, temperatures, capacity levels, identification information, rates of storage capability, time periods associated with charging times, and the like). The information may be communicated to a first display 70 over a second bus 72 that may share a common physical connection with the first bus 68, but transfer data using a different baud rate and protocol from a protocol of the first bus 68. The first display 70 may present the battery information in a graphical user interface (GUI) to allow the user to monitor various aspects related to electrical characteristics of the management circuit 42.

In operation, information such as voltage, current, temperature, charge levels, etc. is stored in memory location of the management circuit 42. The control circuitry 66 performs queries to the location for each piece of information. For example, the query may access a particular memory block associated with voltage and a value is returned to the controller 66. The controller may then compare the voltage value stored in the memory block with a maximum and a minimum threshold for the given voltage value and, based on that comparison, may adjust the second alternator 16 or another electrical property of the management unit 42. By incorporating a CAN network, the information is sent in packets containing a string, such as a file name, (e.g., "battery states") that is processed and returned by the management unit 42 with the appropriate information. Further, the protocol may allow for error checking to be completed based on a number of packets sent and/or received (exchange in the data stream) between the controller 66 and the management unit 42.

The control circuitry 66 may electrically interpose the second alternator 16 and the management unit 42. For example, the control circuitry 66 may include a conductor electrically coupled with a field wire of the second alternator 16. By having communication with the management unit 42 and the alternator 16, the control circuitry 66 may be configured to communicate an instruction or signal (e.g., a PWM DC signal) to the second alternator 16 to control a speed of a rotor in the second alternator 16 in response to the parameters identified over the first bus 68. For example, if the controller 66 queries the battery unit (e.g., the management circuit 42) to a particular location in a memory stored in the management 42 for diagnostic information (e.g., voltage values, current values, temperatures, etc.), the controller 66 may then process the returned values and control a signal over the conductor to change a speed or output voltage, of the second alternator 16. In one operation, when the controller 66 determines that a large electrical load is on the second batteries 22 and the batteries 22 are fully charged, the controller 66 may adjust operation of the second alternator 16 to stop or slow power feed from the second alternator 16 prior to de-energizing the second batteries 22.

In some examples, the first display 70 is a read-only display, such that inputs to the GUI of the first display 70 do not cause the controller 66 to communicate differently with the management circuit 42. In other examples, communication with the first display 70 may be used for controlling at least some aspects of the management circuit 42, such as in a troubleshooting menu of the GUI, etc. The GUI may also allow for control of house loads 38.

In some examples, the control circuit 66 is also in communication with one or both of the first and second alternators 14, 16 as previously described. For example, the controller 66 may be in communication with the regulators 34 of the first and second alternators 14, 16 to control the charging voltages from the first and second alternators 14, 16. Various electrical components may be included in the regulation circuitry of some or all of the first alternator 14, the second alternator 16, and the management circuit 42, such as transistors, capacitors, inductors, switching devices, and the like. In this way, the control circuit 66 may control aspects of both the primary and auxiliary circuits 24, 26 of the power system 10 of the present disclosure. As previously described, the controller 66 may control the field current of the second alternator 16 via the conductor previously described or via the first or second buses 68, 74 via a data connection. In addition, the control circuit 66 may control the DC-to-DC charger 28 by communicated with a microprocessor of the charger 28 or an array of transistors (e.g., and H-bridge arrangement of MSFETS). For example, the control circuit 66 may directly or indirectly control the charger 28 to limit or allow charging of the primary battery 20 based on an electrical load of the system.

The communication circuit 64 also includes a second display 74 in communication with the management circuit 42 via a third bus 76. The third bus 76 may employ a communication protocol typically employed for programmable logic controllers that communicate serially. The second display 74 may also, or alternatively be employed to modify several parameters associated with the auxiliary circuit 26. In some examples, the second display 74 is configured for presenting read-only data related to similar parameters presented at the first display 70. For example, an indicator of a level of charge of the second power storage devices 22 may be presented at the second display 74, as well as controls for charging or discharging the second power storage devices 22. In general, the communication circuit 64 may be employed to allow user access to operation of the auxiliary circuit 26 generally. In some examples, presentation to the user via the GUIs of either or both of the first and second displays 70, 74 is read-only, such that the user control over the management circuit 42 is limited to direct control by the control circuit 66.

The charger 28 previously described may be positioned between the primary circuit 24 and the auxiliary circuit 26 to allow for shared communication between the primary and auxiliary circuits 24, 26. In particular, the charger 28 may interpose two bridge portions 78 of the power system 10, with one bridge portion 78 associated with the auxiliary circuit 26 and the other bridge portion 78 associated with the auxiliary circuit 26, that serve to link the auxiliary circuit 26 with the primary circuit 24. With particular reference to FIG. 2, the charger 28 may be employed to step down the second charging voltage from a higher DC voltage (e.g., 54.8 VDC) to the first charging voltage at a lower voltage (e.g., 14.4 VDC) and vice versa. For example, the charger 28 may step up the voltage from the primary circuit 24 voltage to the auxiliary circuit 26 voltage to allow the primary circuit 24 to charge portions of the auxiliary circuit 26 and to allow the auxiliary circuit 26 to charge portions of the primary circuit 24. In this way, the primary circuit 24 of FIG. 2 may have bidirectional communication from the primary circuit 24 with the auxiliary circuit 26. In some examples, the charger 28 operates as a charger that may employ various electrical components forming a charging circuit for either or both of the first power storage device 20 and the second power storage device 22. For example, the charging circuit may include a microprocessor and/or one or more transistors, voltage dividers, and capacitors that allow for a charging current to be output via either or both of the bridge portions 78. In this way, electrical current from the first power storage device 20 may be employed to power one or more components of the auxiliary circuit 26, and electrical current generated via the second power storage device 22 may be employed to power one or more components of the primary circuit 24.

Referring particularly now to FIG. 3, the charger 28, or another component disposed in series with the converter module 28, may be configured to limit electrical communication from the primary circuit 24 toward the auxiliary circuit 26. For example, the charger 28 may include gate circuitry 80 interposing the auxiliary circuit 26 and the primary circuit 24 to limit backflow electrical current from flowing from the first power storage device 20 toward the second power storage device 22. More particularly, the gate circuitry 80 may interpose the pair of bridge portions 78 to allow electrical current to flow from the auxiliary circuit 26 toward the primary circuit 24 but to limit electrical current from flowing from the primary circuit 24 toward the auxiliary circuit 26. In this example, the second power storage device 22 may be employed to charge the first power storage device 20 but not vice versa. It is contemplated that the gate circuitry 80 employed may incorporate one or more diodes or other asymmetric conductance circuitry that are forward biased from the auxiliary circuit 26 toward the primary circuit 24. Additionally, or alternatively, the term "gate circuitry" includes any circuitry, such as a microprocessor, a transistor arrangement (e.g., an H-bridge transistor arrangement), or the like, that limits current flow from one node to another. In some examples, the gate circuitry 80 is selectively controlled to allow for a first directional flow (e.g., from primary to secondary circuits 24, 26) or a second directional flow (e.g., from the secondary circuit 26 toward the primary circuit 24) based on the particular electrical components energized by, e.g., the controller 66.

Referring more particularly now to FIG. 4, both the first and second alternators 14, 16 may be operable at the first charging voltage (e.g., 14.4 VDC). By providing the first and second alternators 14, 16 of a common voltage, both the first and second alternators 14, 16 may be configured to charge the first power storage device 20 and, via the charger 28, the second power storage device 22. Although illustrated as having two-way communication in FIG. 4, is contemplated that the charger 28 may employ a unidirectional charging mode previously described in relation to FIG. 3, but biased away from the primary circuit 24 and toward the auxiliary circuit 26. Stated differently, in some examples, the gate circuitry 80 may be configured to bias an electrical current from the primary circuit 24 toward the auxiliary circuit 26. In these examples, various overvoltage and/or overcurrent conditions may be protected by fusing or other protection circuitry to limit the amount of power contributed by the primary circuit 24 to the auxiliary circuit 26 so as to prioritize powering the primary circuit 24 over the auxiliary circuit 26. In general, the configurations described above may be described with respect to particular elements of the circuit (e.g., the first and second alternators 14, 16) and/or with respect to the circuits described. For example, although the charger 28 is described as electrically interposing the first and second power storage devices 20, 22 in some examples, it is contemplated that the charger 28 may also or alternatively interpose other components of the primary and auxiliary circuits 24, 26, respectively. For example, the gate circuitry 80 of the charger 28 may electrically interpose the second alternator 16 and the first power storage device 20 to limit the backflow electrical current from flowing from the first power storage device 20 toward the second alternator 16.

Figure 5:
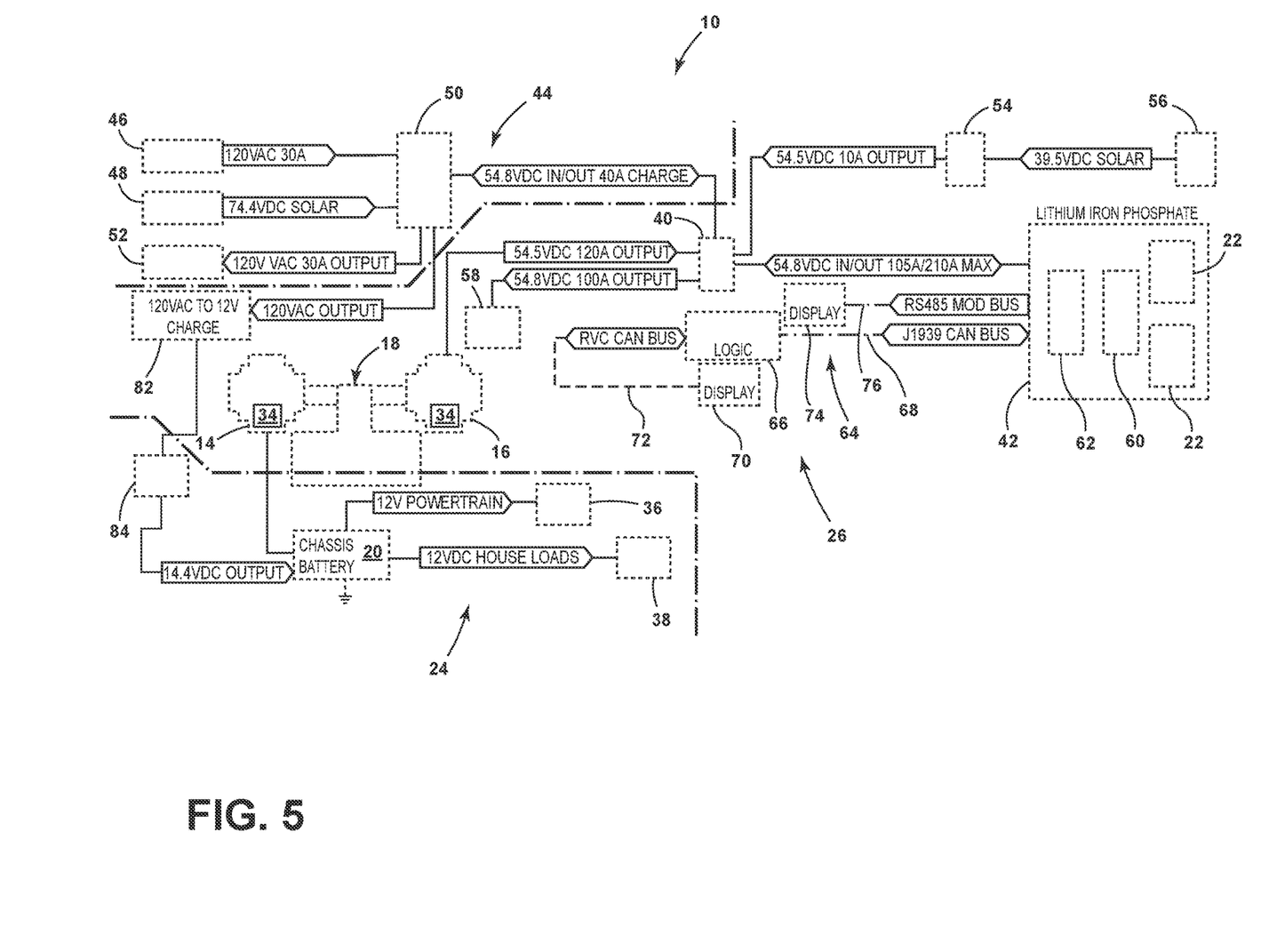
FIG. 5 is a block diagram of one exemplary implementation of the power system of the present disclosure.

Referring now to FIG. 5 more particular, in another example of the power system 10 of the present disclosure, the first alternator 14 is configured to output the first charging voltage for the primary circuit 24, and the second alternator 16 is configured to output the second charging voltage for the secondary circuit 26. In this example, the dual-charging approach may be accomplished via electrical connection from the inverter-charger 50. With the charger 28 omitted in the present example, the power system 10 may incorporate another a second charging device 82 that is operable as an AC-to-DC one way charging device. For example, and as illustrated in the FIG. 5, the second charging device may receive a 110-120 VAC input from the inverter-charger 50 and convert to the first charging voltage (e.g., 12 VDC or higher). An isolator relay 84 may interpose the second charging device 82 and the primary circuit 24 to allow for selective backup charging of the primary battery 20. A coil of the isolator relay may be electrically coupled with the controller 66 to allow the controller 66 to control completion of the backup charging circuit. For example, the controller may detect a low battery level for the first battery 20 and energize the relay 84 to provide additional charging power through the short power circuit 44.

In the present example, the secondary batteries 22, which are 48V batteries, managed by the management unit 42 power the auxiliary circuit and are charged via the second alternator. However, in addition, or in an alternative, the shore power circuit 44 may charge the second batteries 22 via, e.g., the solar inverter-charger 50. Thus, in some examples, the exemplary power system 10 illustrated in FIG. 5 may provide for a backup charging circuit via the shore-power circuit 50.

In general, the present disclosure may provide for a more efficient and effect dual-charging approach for recreational vehicles that incorporate 48 VDC systems. The interposing arrangement of the control circuitry 66 between the management unit 42 and the second alternator 16 may provide for more fine-tuned control. Further the various two-way communication provided by the chargers 28, 82, as well as the control over charging operations by the controller 66 may provide for improved electrical power regulation throughout the power system 10.

In the foregoing description, it will be readily appreciated by those skilled in the art that modifications may be made to the embodiments as disclosed herein without departing from the concepts as disclosed herein. Such modifications are to be considered as included in the following claims, unless these claims by their language expressly state otherwise.

The invention claimed is:

1. A charging arrangement for a vehicle, comprising:
   a first alternator and a second alternator each configured to be driven by an engine system of the vehicle;
   a first power storage device electrically coupled with and chargeable by the first and second alternators, the first power storage device configured to store power at a first storage voltage, the first power storage device configured to power a primary circuit for the vehicle comprising a powertrain device for the engine system; and
   a second power storage device electrically coupled with and chargeable by the second alternator, the second power storage device configured to store power at a second storage voltage different than the first storage voltage, the second power storage device configured to power an auxiliary circuit for the vehicle; and a charger interposing the first and second alternators and configured to output a first charging voltage equal to the first storage voltage and a second charging voltage that is different than the first charging voltage and equal to the second storage voltage.

2. The charging arrangement of claim 1, wherein the first charging voltage is less than the second charging voltage.

3. The charging arrangement of claim 1, wherein the first storage voltage is less than the second storage voltage.

4. The charging arrangement of claim 1, wherein the first storage voltage is substantially equal to 12 volts and the second storage voltage is substantially equal to 48 volts.

5. The power system of claim 1, wherein the first power storage device includes at least one lead acid battery configured to power a primary circuit for the vehicle and the second power storage device includes at least one lithium iron phosphate battery configured to power an auxiliary circuit for the vehicle.

6. The power system of claim 5, wherein the primary circuit is configured to power the auxiliary circuit and the auxiliary circuit is configured to power the primary circuit.

7. The power system of claim 1, wherein the charger is configured to limit a backflow electrical current from flowing from the first power storage device toward the second alternator.

8. The power system of claim 7, wherein the charger includes one or more transistors controlled to selectively allow electrical current to flow from the secondary alternator through the charger.

9. The power system of claim 1, wherein the auxiliary circuit includes at least one of a solar charging circuit configured to provide electrical power to the auxiliary circuit and a shore power circuit configured to receive an alternating-current signal external to charge at least a portion of the auxiliary circuit.

10. A vehicle comprising the charging arrangement and the engine of claim 1.

11. A charging arrangement for a vehicle, comprising:
a first alternator configured to be driven by an engine system of the vehicle and configured to output a first charging voltage;
a second alternator configured to be driven by the engine system and configured to output a second charging voltage that is higher than the first charging voltage;
a first power storage device electrically coupled with and chargeable by the first and second alternators, the first power storage device configured to power a primary circuit for the vehicle comprising a powertrain device for the engine system, wherein the first power storage device is configured to store power at a first storage voltage;
a second power storage device in electrical communication with and chargeable by the second alternator, the second power storage device configured to power an auxiliary circuit for the vehicle, wherein the second power storage device is configured to store power at a second storage voltage different than the first storage voltage; and
a charger interposing the second alternator and the first power storage device, the charger configured to limit a backflow electrical current from flowing from the first power storage device toward the second alternator, and reduce the second charging voltage to the first charging voltage for charging the first power storage device.

12. The charging arrangement of claim 11, wherein the charger includes an H-bridge transistor arrangement allowing forward electrical current to flow from the secondary alternator through the charger.

13. The charging arrangement of claim 11, wherein the first storage voltage is substantially equal to 12 volts and the second storage voltage is substantially equal to 48 volts.

14. The power system of claim 11, wherein the first power storage device includes at least one lead acid battery configured to power a primary circuit for the vehicle and the second power storage device includes at least one lithium iron phosphate battery configured to power an auxiliary circuit for the vehicle.

15. A vehicle comprising the charging arrangement and the engine of claim 11.

16. A charging arrangement for a vehicle, comprising:
a primary electrical system configured to be powered by a first alternator and a second alternator each configured to be driven by an engine system of the vehicle and configured to output a first charging voltage for the primary electrical system, the primary electrical system configured to power a powertrain of the vehicle and charge a first battery;
a secondary electrical system configured to output a second charging voltage for the secondary electrical system higher than the first charging voltage, the secondary electrical system configured to power auxiliary components of the vehicle and charge a second battery; and
a charger unit electrically interposing the primary and secondary electrical systems and configured to step down the second charging voltage to the first charging voltage and/or step up the first charging voltage to the second charging voltage, wherein the stepping down allows the secondary electrical system to charge the first battery and the stepping up allows the primary electrical system to charge the second battery.

17. The charging arrangement of claim 16, wherein the secondary electrical system includes a management circuit for adjusting the second charging voltage for at least one lithium iron phosphate cell of the second battery.

18. The charging arrangement of claim 16, wherein the secondary electrical system includes a control circuit in having at least one display in communication with the management circuit for displaying charging information related to the second battery.

19. The charging arrangement of claim 18, wherein the charging information includes at least one of an expected duration of charging, a capacity level, a voltage level, a current level, an expected duration of use, or any combination thereof for the second battery.

20. The charging arrangement of claim 16, wherein the control circuit is configured to communicate at least one signal to the management circuit to control charging of the second battery.

* * * * *